July 8, 1958 P. BAKKER 2,842,622

CARRIER ADAPTER CIRCUIT

Filed March 24, 1955 3 Sheets-Sheet 1

INVENTOR.
PIER BAKKER
BY [signature]

ATTY.

July 8, 1958 P. BAKKER 2,842,622

CARRIER ADAPTER CIRCUIT

Filed March 24, 1955 3 Sheets-Sheet 2

PABX TERMINATION CKT. 200

INVENTOR.
PIER BAKKER

BY Mc Walter Owen.

ATTY.

CARRIER ADAPTER CIRCUIT

Filed March 24, 1955 3 Sheets-Sheet 3

CENTRAL OFFICE TERMINATION CKT. 300

INVENTOR.
PIER BAKKER
BY Wm. Walter Owen
ATTY.

2,842,622
Patented July 8, 1958

2,842,622

CARRIER ADAPTER CIRCUIT

Pier Bakker, Chicago, Ill., assignor to General Telephone Laboratories, Incorporated, a corporation of Delaware Application March 24, 1955, Serial No. 496,553

13 Claims. (Cl. 179—43)

Figure 1:
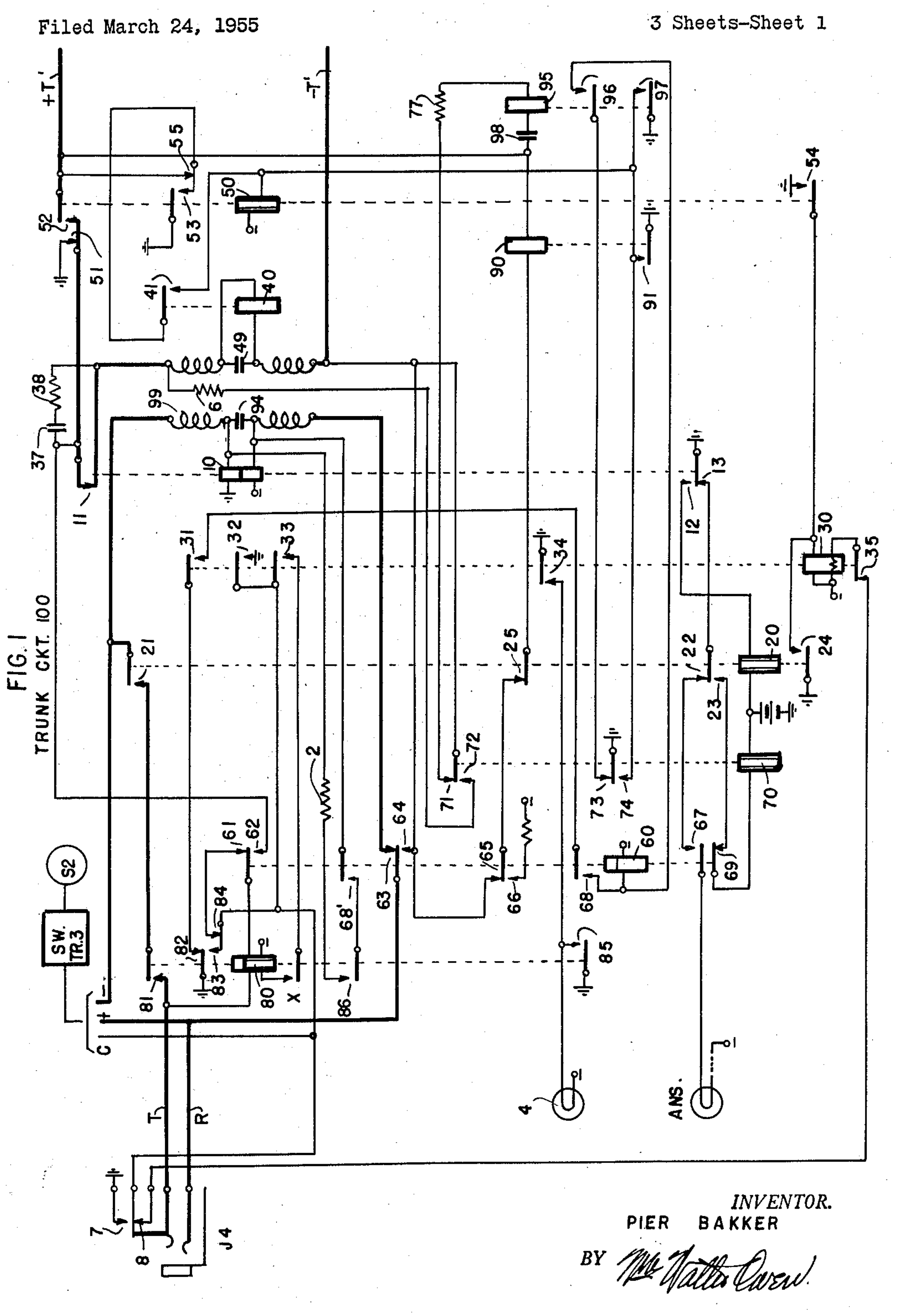

The present invention relates in general to a communication system utilizing carrier transmission equipment and in particular to an arrangement for enabling the use of such carrier transmission equipment between a private branch exchange and a central office.

The practice in the telephone art is to terminate each inter-office trunk in a line which may be seized from a selector level if automatic service is provided between exchanges and directly by an operator if manual service is provided. At the incoming office an incoming selector is connected to the line or trunk and it is operated over a dialling loop immediately completed thereto on seizure of the trunk at the outgoing office, or if the incoming office is a manual office an operator is signalled. A trunk circuit for use in an arrangement of the type described is usually dry, when idle, that is without current flowing therein due to no battery or ground being connected thereto or it may have ground connected to ground and battery connected to battery at the respective stations over respective sides of the trunk. On seizure the line is supplied with proper potentials to operate the equipment at the incoming office to signal that office and seize the incoming selector thereat. To meet these conditions and variations thereof many well-known carrier adapter circuits have been devised to enable carrier transmission systems to be used with the exchange equipment without disturbing the standard battery and ground connections at the trunk terminations.

However, a private branch exchange or office, commonly known as a P. A. B. X, is usually accessible to a central office connector switch through a line circuit individual to the P. A. B. X in the same manner as an ordinary subscriber, and likewise if automatic service is provided to the P. A. B. X, a P. A. B. X subscriber has access to a called subscriber by means of the central office switching equipment controlled through the line circuit. If the P. A. B. X were accessible from a selector, an entire level of each selector bank would be rendered inaccessible to other calls regardless of the number of the trunks between the central office and P. A. B. X, and therefore it has been found most economical to have the P. A. B. X accessible to a connector switch on an incoming call to the P. A. B. X. The line circuit through which the connector has access to the P. A. B. X may be used to associate the central office switching equipment therewith on an outgoing call from the P. A. B. X. The line circuit may be easily converted to signal the P. A. B. X immediately when it is seized in the central office to prevent those on the verge of calling from the P. A. B. X from using the line. Regular subscribers lines normally have ground connected to one side of the line and battery to the other. P. A. B. X trunks however, when terminated in a line circuit in the same exchange, must have this ground to the one side of the line normally disconnected. Disconnecting ground from the positive side of the line by slipping an insulating sleeve between the springs at the line circuit connecting ground to the positive side of the line provides an economical conversion of an ordinary subscriber's line circuit to a P. A. B. X line circuit. The negative side of the line is maintained connected to battery through the line circuit line relay. When the line circuit is arranged as above, equipment may be bridged across the line at the P. A. B. X without being operated except when the central office connector switch or an operator disconnects the line relay and applies ground and battery to the line, when seizing it at the central office. Operating the bridged equipment at the P. A. B. X busies the trunk circuit at the P. A. B. X to prevent someone at the P. A. B. X from seizing the trunk circuit while the connector switch is applying ringing current to the trunk and thereby receiving a very unpleasant sensation or interfering with the call. Likewise the P. A. B. X termination of the trunk is usually provided with an open positive line to maintain the line circuit line relay at the central office and the bridged equipment at the P. A. B. X normally unoperated while permitting the line relay at the central office normally connected to battery to be operated on a call from the P. A. B. X after disconnecting the bridge equipment at the P. A. B. X and closing one side of the line to ground in the P. A. B. X. Operation of the line relay immediately busies the central office termination to outgoing calls therefrom. From the foregoing description it will be appreciated that a dialling loop is not completed on a call to the P. A. B. X and is completed on a call from the P. A. B. X only after the operated line relay in the central office causes certain central office switching equipment to be associated with the line circuit and return ground and battery back over the trunk so that a call may be automatically extended. Of course if the central office is manual the operated line relay signals the operator and she completes the call to a desired central office subscriber.

It will be understood that one or more repeating coils may often be provided between the P. A. B. X and the central office so that the circuits terminating in either office may not be physically connected together and that various arrangements are adopted to repeat signals around the coils.

From the foregoing description it may be readily appreciated that a number of differences exist between the ordinary inter-exchange trunks wherein standard carrier transmission systems are most generally used and for which carrier has been primarily designed and the P. A. B. X circuits of the type described, and that the accomplishment of various signalling requirements by means of the P. A. B. X circuits described proceeds in a manner different than in ordinary inter-exchange trunks necessitating numerous and difficult adaptions before a standard carrier transmission system can be used with P. A. B. X circuits of the type described.

It is therefore an object of the present invention to provide an arrangement utilizing a standard carrier transmission system between offices which have an open positive line associated with those circuits which are available for use in extending a call such as the P. A. B. X trunks above described, and it is a further object of the present invention to enable such circuits to provide conventional signalling results in response to dial pulses and other signals transmitted over the carrier equipment.

The invention is described herein as operating in conjunction with a P. A. B. X and a central office which may be either an automatic or manual type office. The circuits are arranged so that either a P. A. B. X subscriber or attendant can connect directly to the central office via the carrier transmission equipment and if the central office is arranged as an automatic type, a call is automatically completed directly to a subscriber in the central office on the dialling of the called subscriber's number. If the central office is arranged as a manual office of course the operator thereat is signalled to answer the call and she completes the call. Incoming calls to the P. A. B. X are completed from a subscriber in an automatic central office directly to the P. A. B. X attendant, who after receiving a calling signal and answering the call connects to the P. A. B. X subscriber. If the central office is a manual one the operator thereat completes the call to the attendant at the P. A. B. X and she connects the desired P. A. B. X subscriber. In addition it will be noted at this time that provision is made for a central office operator to signal the P. A. B. X attendant as often as desired during the period in which a connection is already established.

Figure 2:
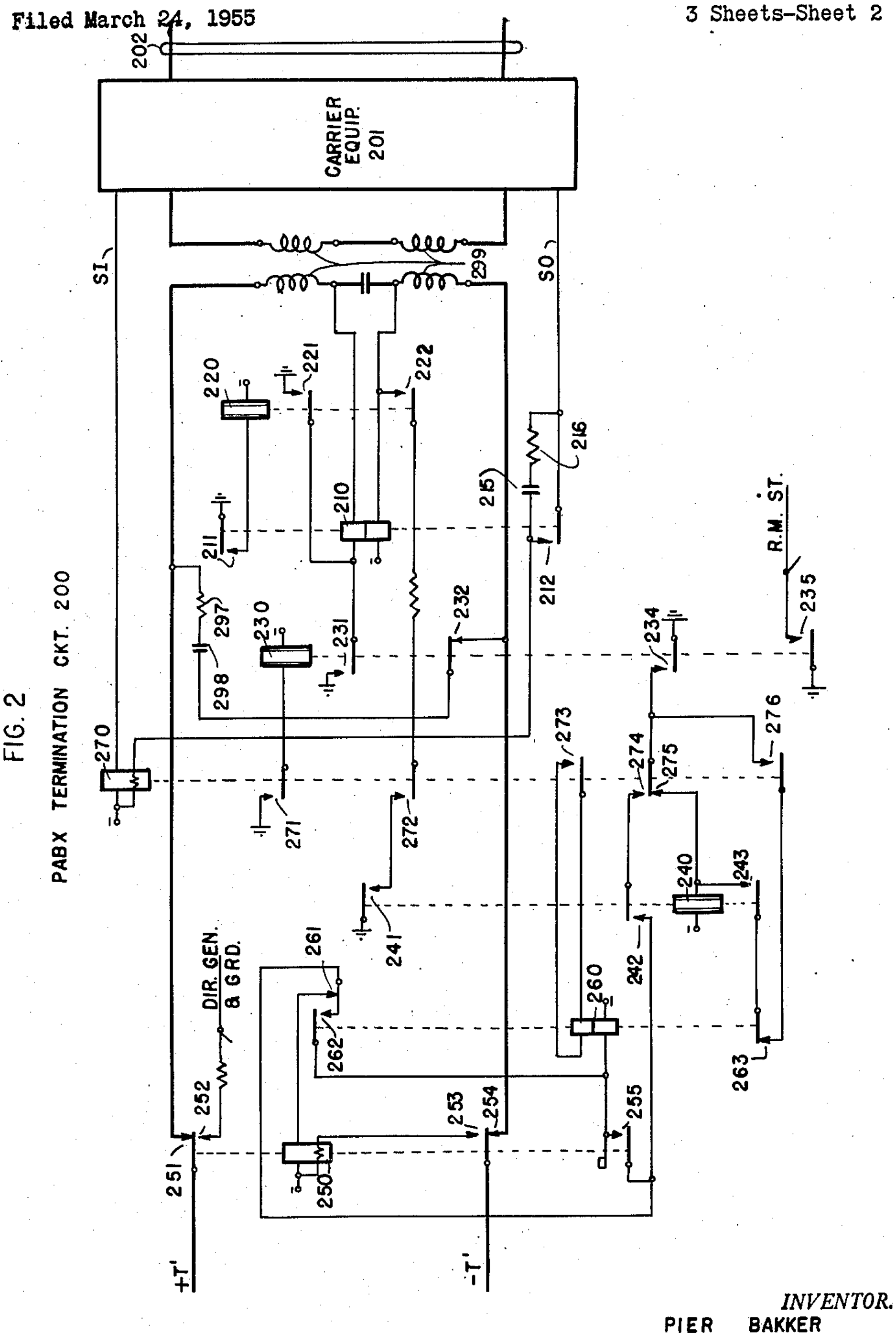

Figs. 1 and 2 respectively illustrate an ordinary type of P. A. B. X trunk circuit 100 and a P. A. B. X termination circuit 200 adapted to enable the trunk circuit 100 to operate with carrier equipment. These circuits are accessible to an attendant through jack J4 or to a P. A. B. X subscriber such as S2 over switch train 3 when making an outgoing call. Fig. 2 also includes a block 201 for indicating the carrier equipment at the P. A. B. X office which is utilized with the aforementioned circuits for extending calls between the P. A. B. X and the central office over line 202.

Figure 3:
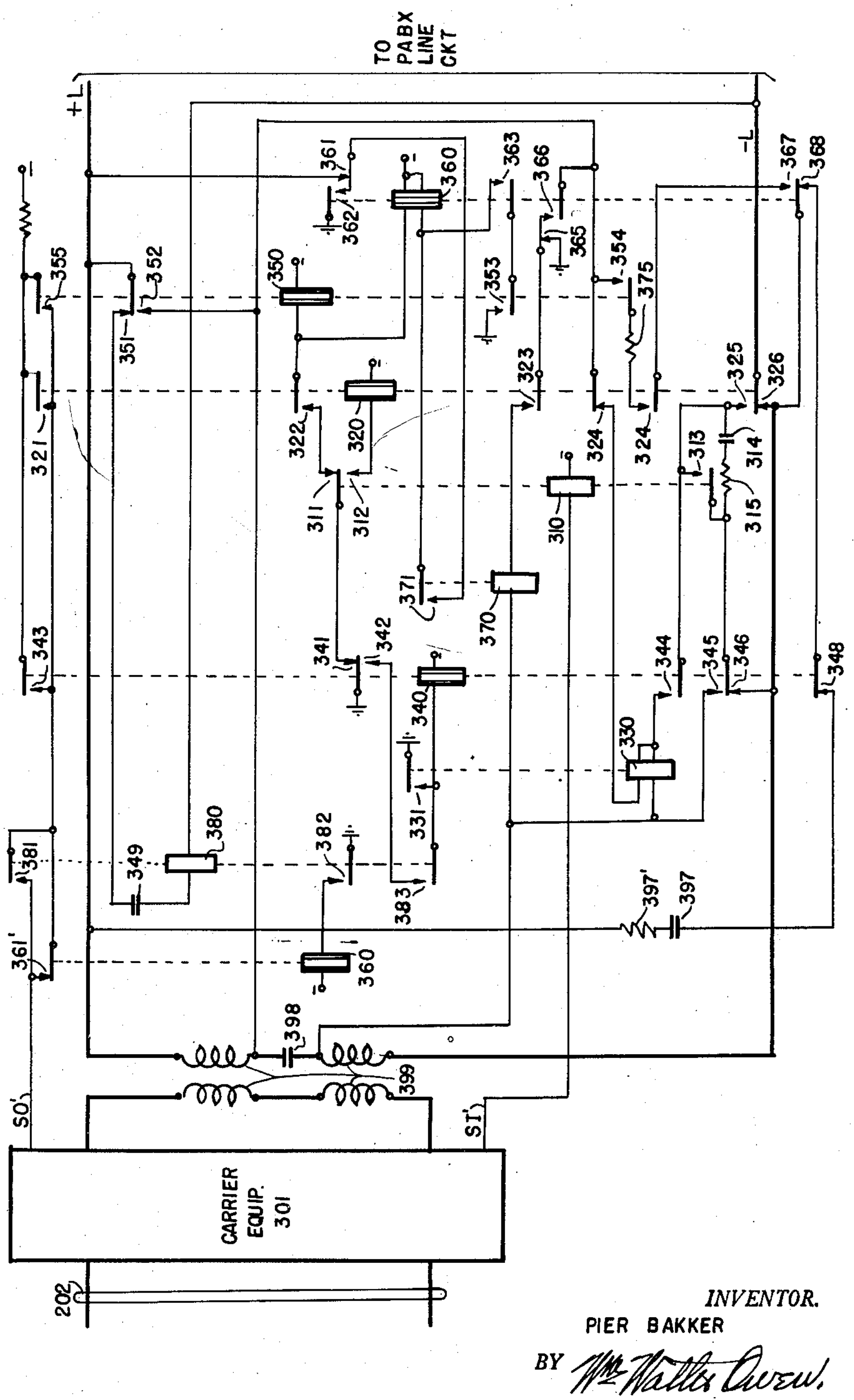

Fig. 3 illustrates the central office termination circuit 300 accessible from the P. A. B. X on a call to the central office over the line 202 and the carrier equipment indicated by the block 301. It has connected thereto over the +L and —L conductors, a conventional line circuit (not shown) of the type wherein ground is disconnected from the +L conductor as previously explained. As already mentioned the central office may be either of a manual or automatic type, and if the latter a subscriber in the central office has direct access to circuit 300 for connecting to the P. A. B. X circuits and he is accessible directly from circuit 300 over the central office switching equipment on a call from the P. A. B. X.

A switch train 3 comprising any well-known type of finder and selector switches of the battery searching type is available to a P. A. B. X subscriber for extending a call. He may extend the call to a trunk circuit such as trunk circuit 100 and P. A. B. X termination circuit 200 having access to the central office circuits over carrier equipment 201 and 301 by dialling a predetermined digit on the selector switch. The selector switch on finding trunk circuit 100 idle in turn switches through in any well-known manner to operate relay 10. Relay 10 initiates a series of operations for closing ground to the +T' conductor leading to the P. A. B. X termination circuit 200 by means of relay 220 to complete the seizure of that circuit. It also busies the trunk circuit 100 to incoming calls from another switch train such as 3 and to the P. A. B. X attendants. If the central office is of an automatic type it is provided with switching equipment of any well-known type whereby a connection may be established over a switch train of the type described from a central office subscriber to circuit 300 or from circuit 300 to a central office subscriber, that train including a connector switch of any well-known type designed to provide interrupted ringing current. It will also be understood that such switches are provided with means for returning ground and battery over the +L and —L conductors respectively when associated with circuit 300 and that the connector switch is provided with well-known ring cut-off and reverse battery relays.

Relays 210 and 220 in P. A. B. X termination circuit 100 are operated on seizure. Relay 220 actually closes ground to the +T' conductor to complete a loop circuit for relay 210 which is already operated. Relay 210 forwards battery over the signal-out lead SO to cause carrier equipment 201 to forward a tone of a particular frequency over line 202 to carrier equipment 301 which contains any well-known type of control equipment operated in response to the received particular tone frequency to apply ground to the signal-in lead SI' and operate relay 310 in the central office termination circuit 300.

The carrier equipment is of any well-known type such as the Lenkurt type 45A constructed to transmit a tone signal on the application of battery to the respective signal-out leads SO or SO' at the respective stations and arranged to rectify the transmitted tone and provide a ground to the respective signal-in leads SI or SI' at the respective stations. Voice frequencies are transmitted over one portion of an available band width and the tone frequencies emanating from the respective stations are transmitted as respective sidebands over another portion of the available band width in any well-known manner. It will be appreciated that any number of different arrangements may be utilized in place of that described and although a physical line 202 is shown connecting carrier equipment 201 and 301, it will be understood that the line may be dispensed with, if the carrier equipment incorporates radio transmission.

Relay 310 operates to operate relay 320 which in turn operates relay 370 and relay 370 in turn operates relay 360. The line circuit (not shown) associated with circuit 300 is of any well-known type which provides battery through a line relay (not shown) to the —L conductor but no ground for the +L conductor as previously mentioned. The upper and lower windings of high resistance relay 330 are normally connected between battery on the —L conductor and the +L conductor. It is disconnected on operation of relay 320. Relay 320 connects ground through relay 370 to battery on the —L conductor through the line relay and both are operated. Operation of the line relay initiates operation of the automatic switching equipment in the exchange and busies the line circuit to calls from the central office in any well-known manner. The automatic switching equipment in the exchange comprises any well-known type of finder, selector and connector switches, each of which is arranged to send ground back over the +L conductor and battery over the —L conductor through their respective line relays. Thus when the line circuit associated with circuit 300 is found by the appropriate switch, ground is sent back over the +L conductor and battery over the —L conductor and the line circuit cut-off relay (not shown) is operated in any well-known manner to disconnect the line circuit line relay. The ground on the +L conductor is sent over a circuit prepared by relay 370 to operate relay 360 which in turn completes the loop from the line relay over the +L and —L conductors through relay 370 and removes the original operating ground from relay 370.

If the exchange is a manual one an operator must complete the connection. The same series of operations takes place for disconnecting relay 330 and connecting relay 370 so that the line relay can operate and signal an operator. The operator then completes the connection.

On calls to an automatic exchange the P. A. B. X subscriber operates his dial in any well-known manner to pulse relay 10. The pulses are repeated at contacts 11 to pulse relay 210 over its loop circuit. Relay 210 in turn pulses the carrier relays which in turn pulse relay 310 in any well-known manner. Relay 310 pulses the automatic switching equipment at contacts 313 to operate the equipment to the desired position. On completion of the connection the called subscriber is automatically signalled by interrupted ringing current applied to his line in any well-known manner. On answer a talking circuit is completed over the loops extending over switch train 3 and repeating coils 99, 299 and 399 and the loop extending over the automatic switching equipment to the called subscriber.

The P. A. B. X attendant extends a connection to the central office in a similar manner using her cord circuit and jack J4. Likewise if an operator in the central office must extend the connection she utilizes her cord circuit for first completing the talking circuit to the P. A. B. X attendant and then to the called subscriber. The cord circuits are of any well-known type which include equipment for controlling automatic equipment and for completing talking circuits over the same repeating coils as described above.

On an incoming call to the P. A. B. X the central office termination circuit 300 is seized first in any well-known manner from a connector switch in the central office or by an operator plugging in to seize the circuit. Ground and battery are extended over the +L and −L conductors respectively. As relay 330 is in the loop it operates. Relay 340 operates under control of relay 330 to apply battery to lead SO′ and cause a tone signal to be transmitted over carrier equipment 301 and 201 and ground to be placed on lead SI to operate relay 270. Relay 270 operates relay 230 and it in turn applies ground to the +T′ conductor. High resistance relay 90 in trunk circuit 100 is operated thereby to seize the trunk circuit and busy it to calls from the P. A. B. X.

When the connector applies interrupted ringing current over the +L and −L conductors or the operator manipulates her ringing key, A. C. relay 380 in circuit 300 is operated and released. Relay 270 releases when relay 380 is released and then it is reoperated. Relay 270 releasing and reoperating gives rise to a cyclic operation for relays 240, 250 and 260 to apply A. C. ringing current to the +T′ and −T′ conductors for operating A. C. relay 95. Relay 95 operates the P. A. B. X attendant's calling lamp so that an attendant answers the call. The P. A. B. X attendant signalling operation proceeds as long as interrupted ringing current is applied to relay 380.

When the P. A. B. X attendant answers relay 10 is operated to complete a loop circuit for operating relay 210. Relay 210 applies battery to lead SO to operate relay 310 in circuit 300. Relay 310 shunts the high resistance lower winding of relay 330 from the loop circuit at contacts 313 to allow the connector ring cut-off relay and the reverse battery relay in the connector to operate and cut off the interrupted ringing current and provide answer supervision for the calling party respectively. Likewise the short circuit of the lower winding of relay 330 enables a relay to operate and signal the operator that the call is answered in the case of an operator completed call. The P. A. B. X attendant completes a talking circuit to the calling position and then connects the desired P. A. B. X subscriber to the calling position and completes a talking circuit therebetween. Also if the connection to the P. A. B. X is from a manual office, the operator thereat may again manipulate her ringing key to repeat the operation for releasing relay 270, reoperating it and reoperating relays 240, 250, 260 and A. C. relay 95 to again signal the attendant. The attendant may then complete a connection to another P. A. B. X subscriber. A more detailed and comprehensive description including the respective release operations is described in the following sections entitled outgoing P. A. B. X calls and incoming calls respectively.

*Outgoing P. A. B. X calls*

A P. A. B. X subscriber such as S2 initiates a call to a subscriber in the main exchange and by dialling a predetermined digit over switch train 3 steps the battery searching selector switch of the train to a level corresponding to the digit, where it automatically hunts for an idle trunk circuit such as trunk circuit 100. In hunting for an idle trunk circuit the selector switch tests trunk circuit 100 by searching for battery over lead C, contacts 8 associated with each attendant's jack individual to the trunk, contacts 35 and the lower winding of relay 30. This is only a resistance winding so relay 30 does not operate from ground placed on the C lead at the selector. On finding battery the selector terminates its hunting operation, and the switch through relay therein operates to complete a loop circuit to relay 10 from battery through the lower winding of relay 10, the lower left winding of repeating coil 99, contacts 63, the − lead to the switch train loop, over the switch train loop including the dial springs of the calling subscriber and back over the + lead, through the upper left winding of repeating coil 99 to ground through the upper winding of relay 10.

Relay 10 operates and closes contacts 12 to complete a circuit to slow-to-release relay 20, and at contacts 11 it completes a circuit including ground at contacts 51, the upper right winding of repeating coil 99, the winding of relay 40, the lower right winding of repeating coil 99, the −T′ conductor to the P. A. B. X termination circuit 200 and over contacts 254, the lower left winding of repeating coil 299 to battery through the lower winding of relay 210. Relays 40 and 210 operate and the results thereof will be described shortly.

Relay 20 operates to close contacts 21, 23 and 24 and opens contacts 22 and 25. Contacts 21 prepare a point in a loop circuit through the P. A. B. X attendant's cord circuit which will not be used on this type of call. Contacts 23 prepare a circuit to relay 70, and contacts 24 complete an obvious circuit through the upper winding of relay 30. Contacts 22 are opened to open a point in the P. A. B. X answer lamp circuits while opening contacts 25 opens a point in a circuit for operating relay 90. Relay 30 now operates, and opens contacts 35 to remove battery from lead C, while at contacts 32 it grounds lead C so as to busy trunk circuit 100 to incoming calls from other P. A. B. X subscribers and hold the selector switch in train 3. At contacts 34 it completes the circuit to light the busy lamps such as 4 individual to trunk circuit 100 at all appropriate P. A. X attendant positions so that they do not attempt to utilize this trunk circuit.

Relay 40 as previously described is operated by relay 10, and it closes contacts 41 to prepare a circuit to slow-to-release relay 50. The circuit to relay 50 is completed when relay 210 closes contacts 211 to energize slow-to-release relay 220, which in turn closes contacts 221 to forward ground through the upper winding of relay 210, over contacts 251, the +T′ conductor and contacts 55 and 41 to relay 50. Relay 50 operates to complete a holding circuit for itself over contacts 53 and 41, while simultaneously opening its original operating circuit at contacts 55. At contacts 51 it opens the original operating circuit for relays 40 and 210, but at contacts 52 it completes a new circuit for relays 40 and 210 from ground at contacts 221 forwarded over the +T′ conductor, contacts 52 and already described portion of the operating circuit for relays 40 and 210. Relay 50 also closes contacts 54 to complete an obvious holding circuit for the upper winding of relay 30.

Relay 210 on operating also closed contacts 212 to cause battery to be forwarded over the low resistance winding of relay 270, contacts 212 and the signal-out lead SO to operate the signal-out relay (not shown) in the carrier equipment 201. Because of the low resistance winding, relay 270 does not now operate. The signal-out relay and the carrier equipment now cause a tone of a particular frequency to be sent out in any well-known manner from the carrier equipment 201 over the line 202 to the carrier equipment 301 in the central office. A signal-in relay (not shown) in carrier equipment 301 operates in response to the received particular frequency to ground the signal-in lead SI′ and operate relay 310, which in turn operates relay 320.

If the central office termination circuit 300 terminating carrier equipment 301 has direct access to automatic equipment for enabling the calling party to connect directly to a called party a loop circuit is normally prepared from battery through the winding of a line relay (not shown) in the line circuit associated with circuit 300, —L conductor, contacts 326, the lower right winding of coil 399, the lower and upper windings of relay 330, contacts 327, the upper right winding of coil 399 to the +L conductor. Ground is not placed on the +L conductor however until the circuit 300 is found by one of the automatic switches. If circuit 300 is accessed by an operator a similarly prepared circuit is extended to a line or jack relay (not shown), however no potential is placed on the +L conductor until the operator plugs in. Relay 330 is disconnected from the aforementioned prepared loop by relay 320 and ground is connected through relay 370 to the —L conductor in a manner to be described so that the line relay operates to initiate operation of the automatic equipment or if circuit 300 is accessible to an operator, the operator's jack relay operates to signal her.

Relay 310 closes contacts 312 to complete a circuit to slow-to-release relay 320 from ground at contacts 341, and it also closes contacts 313 to prepare a circuit for relay 370 and the line relay. Slow-to-release relay 320 operates to close contacts 321, 322, 323, 324 and 325 and open contacts 326 and 327. Contacts 327 open to disconnect the aforementioned prepared loop circuit through unoperated relay 330. Condenser 397 and resistor 397' which provide a load circuit for the carrier equipment when the equipment is idle, are disconnected at contacts 326. At contacts 323 and 325 the prepared circuit for relay 370 and the line relay is completed from ground at contacts 365 through relay 370, the lower right winding of repeating coil 399, contacts 346, 313 and 325, the —L conductor, to battery through the line relay. Relay 370 operates and prepares a circuit for relay 360 at contacts 371.

The line relay operates in series with relay 370 over the aforedescribed circuit and it initiates operation of the automatic equipment. When the equipment is prepared to receive dial impulses ground and battery are returned over the +L and —L conductors respectively from the line relay (not shown) in the first selector switch of the automatic equipment and the originally operated line relay of the line circuit is disconnected all in a well-known manner. Ground from the +L conductor is forwarded over contacts 361 and 371 to energize the lower winding of relay 360 which operates to prepare a holding circuit for its lower winding at contacts 363. At contacts 361 it opens its original operating circuit and closes a new one from ground at contacts 362 forwarded over contacts 371. The operating circuit for relay 370 is opened at contacts 365 and a new circuit therefor completed from ground on the +L conductor, the upper left winding of repeating coil 399, contacts 366 and the already described portion of its operating circuit to battery on the —L conductor. At contacts 368 another point in the carrier equipment idle terminating load circuit comprising resistor 397' and condenser 397 is opened.

If an operator must extend the call a line or jack relay is operated in series with relay 370 over a circuit similar to that already described for controlling a signal at the operator's position. The operator on being signalled plugs her cord circuit in to provide ground and battery to the +L and —L conductors respectively thereby giving rise to the already described sequence for maintaining relay 370 operated and for operating relay 360.

In the meantime operated slow-to-release relay 320 closed contacts 321 to forward battery over contacts 361' and the signal-out lead SO' to operate the signal-out relay (not shown) of carrier equipment 301. The signal-out relay of carrier equipment 301 on operation causes an appropriate tone signal to be sent over line 202 to the signal-in relay (not shown) of carrier equipment 201 which now applies ground over the signal-in lead SI through the upper winding of relay 270 to operate relay 270. Relay 270 closes contacts 271 to operate slow-to-release relay 230, which in turn closes contacts 231 to prepare an alternate holding ground for the upper winding of relay 210 and opens contacts 232. Condenser 298 and resistance 297 which provide a load circuit for the carrier equipment, when the equipment is idle, to prevent the equipment from whistling or oscillating are disconnected by the opening of contacts 232 as the other elements of the circuit now provide the load. The ringing machine is started at contacts 235, however as contacts 275 remain open as long as relay 270 is operated, relay 240 cannot be operated to operate relay 250, which would send the ringing current back over the +T' and —T' conductors to signal a P. A. B. X attendant.

If the called subscriber is in a manual office the operator on inserting the plug of her cord circuit in the jack at her position terminating circuit 300 may converse with the calling party over a talking loop including the + and — leads in Fig. 1 and contacts 63, the left windings of repeating coil 99 and condenser 94, the right windings of repeating coil 99 including condenser 49 shunting talking current from relay 40, contacts 11 and 52, +T' and —T' conductors, contacts 251 and 254, respectively, the left windings of repeating coil 299 and the condenser between its winding, the right windings of coil 299, carrier equipment 201, line 202, carrier equipment 301, the left windings of coil 399, and a loop circuit from the operator's cord circuit including the +L conductor, the upper right winding of coil 399, condenser 398 shunting talking current from relay 370, the lower right winding of coil 399, contacts 346, 313 and 325 and the —L conductor to the operator's cord circuit. On securing the desired information the operator at the manual exchange proceeds to extend the call in any well-known manner and complete it over her cord circuit. It will be remembered that the tone signal remains on the respective signalling leads but is prevented from interfering with the talking circuit by appropriate filtering elements in the carrier equipment.

On the other hand, if the call is to an automatic office the P. A. B. X subscriber must extend the call over the automatic equipment to the called subscriber by dialling the called subscriber's number. Dialling of the called subscriber's number over the + and — leads from switch train 3 causes relay 10 to follow the dial pulses in any well-known manner and open contacts 11 accordingly. Opening of contacts 12 has no effect on relay 20 as it is slow-to-release, and therefore it remains operated during the dialling of each digit. Each time relay 10 releases it closes contacts 13 to complete a circuit over contacts 23 and 69 to operate slow-to-release relay 70. Relay 70 opens contacts 71 to remove relay 95 from across the talking circuit, closes contacts 74 to complete an additional holding circuit for relay 50, and at contacts 72 shunts the impulses repeated at contacts 11 around coil 99, relay 40 and condenser 49 via the resistance 6. Condenser 37 and resistor 38 are provided for spark suppression. Relay 40 releases when contacts 11 open, and it opens the original holding circuit for relay 50, however relay 50 being slow-to-release remains operated until relay 70 operates to complete the additional holding circuit just described for relay 50. Relay 50 therefore does not restore while the digits are dialled.

Relay 210 releases on each pulse as its circuit is opened at contacts 11 and it follows the dial pulses to pulse contacts 212 accordingly. Condenser 215 and resistor 216 are provided to suppress sparking at contacts 212. The signal-out relay of carrier equipment 201 is thereby also pulsed accordingly to operate the signal-in relay of carrier equipment 301 accordingly. This causes the relay 310 connected to lead SI' to be pulsed in accordance with the dialled digits. Relay 310 pulses the line relay of the appropriate switches of the automatic switching equipment at contacts 313 over a circuit to be described to cause the switch train to be operated to connect to the called party. Condenser 314 and resistor 315 provide spark suppression for contacts 313. Relay 320 does not release during the periods of relay 310 as it is slow-to-release. Slow-to-release relay 350 is operated on the first release of relay 310 over contacts 341, 311 and 322 and remains operated while each digit is dialled. The upper winding of relay 360 is also energized over a circuit including the same contacts. This is done to insure relay 360 remains energized during each series of digits as it has a heavy spring load. A holding circuit for the lower winding of relay 360 is completed from contacts 353 and 363. A shunt circuit at contacts 352, 354, resistor 375, contacts 324, 367, 346, 313 and 325 around the secondary of coil 399 and relay 370 is provided to improve pulsing to the switching equipment. Because of this shunt, relay 370 restores during each digit. It is reoperated after each digit is dialled as the shunt completed by relay 350 at contacts 354 is opened when relay 350 is restored after each digit by the opening of contacts 311. Relay 350 also closes multiple battery to the SO′ lead at contacts 355. Relay 370 opened the circuit to the lower winding of relay 360 at contacts 371 when it restored, but as previously explained relay 360 is held by other circuits completed to both its upper and lower windings. At the end of the dialling operation relay 350 is restored finally to open the holding circuit to the lower winding of relay 360, however the latter is held operated by relay 370 over its original operating circuit. The circuit to its upper winding is opened at contacts 311.

The called party is automatically rung from the connector switch of the switching equipment, and on answer by the called party a talking circuit simliar to that already described but omitting the operator's cord circuit and including the loop over the switching equipment is completed between the parties. In the trunk circuit 100, relay 10 is again continuously energized and relay 70 restored as contacts 13 remain open so that the trunk circuit is in the same condition as on seizure. Likewise, relays 210 and 310 are continuously operated to maintain circuit 200 and circuit 300 in the same condition as on seizure.

It will be understood that the called party on releasing merely causes the connector switch to restore the original polarities to the +L and −L conductors or if the connection is completed by an operator, the operator is signalled to apprise her that the called party has disconnected. The operator may remove her cord circuit, but this merely releases relay 360 for no purpose as relays 310, 370 and 320 maintain circuit 300 seized.

The P. A. B. X subscriber on disconnecting opens the loop to relay 10 and it releases to open contacts 12 and relay 20 starts to restore. Before relay 20 restores relay 70 is operated over a circuit already described and it provides a holding circuit for relay 50 at contacts 74. One circuit to the upper winding of relay 30 is opened at contacts 24, when relay 20 does restore, but relay 30 is held operated from contacts 54. In the meantime before relay 20 is restored the circuit through relays 40 and 210 is opened at contacts 11. Relay 210 releases to open the circuit to relay 220 at contacts 211, but as it is slow-to-release, it maintains ground on the upper winding of relay 210 for a short period thereafter. Relay 230 controlled by relay 270 also maintains ground on the upper winding of relay 210 at contacts 231. Relay 40 opens contacts 41 to open the original holding circuit for relay 50, but it is held operated as already described. When relay 20 is finally restored to close contacts 25, ground is provided from contacts 231 or 221 as relay 220 is not yet completely released, over contacts 251, the +T′ conductor through relay 90, contacts 25 and 65 to battery through the lower winding of relay 210. As relay 90 is of high resistance as compared to relay 210 it only is operated and maintains a holding ground for relay 50 which in turn retains relay 30 operated at contacts 54. Relay 30 maintains trunk circuit 100 busy as previously described.

Relay 210 in series with relay 90 is released and starts the restoration of relay 220 at contacts 211 while at contact 212 it causes the restoration of the carrier signal relays and the removal of ground from lead SI′ to restore relay 310. Relay 310 restores to open the circuit to relay 320 at contacts 312. It also opens the circuit to the connector switch line relay and relay 370 at contacts 313. Both release and the switching equipment also starts to release. Relay 320 is slow-to-release however, and closure of contacts 311 completes an already described circuit for operating slow-to-release relay 350 and energizing the upper winding of relay 360. Relay 350 establishes an already described holding circuit for the lower winding of relay 360 and closes the multiple from battery to lead SO′ at contacts 355. In the event the switching equipment is not completely released by the time 320 restores, the previously described prepared loop circuit excepting the upper right winding of coil 399 which is shunted at contact 352, and including relay 330 is completed to the +L and −L conductors from the line relay of the unreleased switch. If the switching equipment is completely released by the time relay 320 is restored the prepared loop circuit to relay 330 is established, but remains incomplete as ground is not provided to the +L conductor for the reasons already stated. Relay 330 is of high resistance and being in a loop circuit with the line relay of the unreleased switch, it operates, and insures the restoration of that line relay so that the switching equipment continues to release, and when released removes ground from the +L conductor. Relay 320 restores to restore its contacts and open the circuit to relay 350 and the upper winding of relay 360 at contacts 322. Neither is immediately restored. At contacts 321 the original battery to the SO′ lead is removed but as relay 350 is still operated battery at contacts 355 remains thereon until relay 350 restores at which time battery is removed from the SO′ lead. If relay 330 is operated by the release of relay 320 before ground is removed from the +L conductor, it operates relay 340 to maintain battery on the SO′ lead at contacts 343 before release of relays 350 and 360. Relay 340 opens the circuits to relay 350 and the upper winding of relay 360 but those circuits are already opened at contacts 322. Relay 340 at contacts 348 maintains the idle load circuit disconnected. Relay 350 restoring removes the shunt around the upper secondary of coil 399 at contacts 352 and opens the holding circuit for the lower winding of relay 360 and it restores. Battery is removed from the SO′ lead at contacts 355 however it is still applied at contacts 343. Relay 360 of course releases shortly after relay 350 to open the holding circuit to its lower winding at contacts 363 and prepares the carrier idle load circuit at contacts 368. On complete release of the switching equipment ground is removed from the +L lead and relay 330 restores to restore relay 340. It in turn connects the idle load circuit at contacts 348 and removes battery from lead SO′ at contacts 343 to cause the removal of ground on lead SI in circuit 200 to restore relay 270.

If the loop circuit is completed through an operator's cord circuit relay 330 is operated, after relays 310 and 320 release, over the loop circuit to operate slow-to-release relay 340 at contacts 331. Release of relay 310 of course operates relay 350 and maintains 360 operated for some time after relay 320 releases. Battery is thus maintained on the SO′ lead and relay 270 retained operated. Relay 340 closes contacts 343 to place battery on lead SO′ and therefore ground on SI′ to maintain relay 270 as already described and maintain circuits 200 and 100 busy in a manner similar to that done on an incoming call from the central office. Thus the operator at the central office may maintain the connection. The manner in which this occurs will be explained more fully in the portion of the specification dealing with incoming calls from the central office. Also the high resistance relay 330 in the loop restores the jack relay to signal the operator in any well-known manner so that she may disconnect. Relay 330 is then restored to in turn restore relay 340. Relay 340 removes battery at contacts 343 from lead SO' and relay 270 then restores.

Relay 270 releases to restore relay 230. Relay 220 is already completely restored. Relay 230 opens contacts 231 to open the circuit to relay 90. Simultaneously at contacts 232 it restores the non-operating load for the carrier equipment. Relay 90 restores to open the holding circuit to relay 50, and it in turn opens the circuit to the upper winding of relay 30. Relay 30 restores to place the trunk circuit 100 in condition to be seized by another calling party.

The attendant at the P. A. B. X may initiate a call to an operator at the central office or to a subscriber in the central office by plugging her cord circuit in at jack J4, after first insuring that the selected trunk circuit is idle by noting that the busy lamp such as 4 individual to the trunk is dark. Inserting her plug in jack J4 opens contacts 6 to remove battery from lead C and closes contacts 7 to ground lead C so that the trunk circuit is indicated busy to incoming calls from switch train 3. Ground from contacts 7 and on lead C is forwarded over contacts 84, 61, the upper winding of slow-to-operate relay 80, the tip conductor T and the loop through the operator's cord circuit back over the ring conductor R, contacts 63, the lower left winding of repeating coil 99, to battery through the lower winding of relay 10. Relays 10 and 80 operate. Relay 10 completes the aforedescribed circuits to relays 20, 40 and 210 and they in turn operate relays 30, 50, 220 and 310 and complete the aforementioned holding and loop circuits all in a manner described. The aforedescribed operations take place in the central office termination circuit 300 and at the P. A. B. X termination circuit 200 and automatic switching equipment is associated with the central office termination circuit 300 in the well-known manner, or if the office is a manual one, an operator is signalled, and she responds to the call. In the meantime relay 80 whose energized upper winding originally closed only its X contacts, completes a circuit from battery through its lower winding to ground through contacts 33 and 32, and is now fully energized. It completes a loop circuit from ground on one side of relay 10, contacts 21 and 81, the loop over the P. A. B. X attendant's cord circuit including conductors T and R and contacts 63 to battery through the lower winding of relay 10. At contacts 83 it closes a holding circuit for its lower winding through contacts 33 and its X contacts and also provides an additional ground for lead C, while at contacts 84 it opens the original energizing circuit for its upper winding. At contacts 85 it provides another ground for the busy lamp 4, which already lighted when relay 30 operated.

The dialling and talking circuits are as previously described on a call from P. A. B. X subscriber S2 with the exception that the just described loop through the attendant's cord circuit and relay 10 is used instead of the + and − leads and the loop over switch train 3. The attendant may dial over the automatic switching equipment to complete the call or have the operator at the called manual office complete the call in accordance with the type of service provided therein.

The attendant at the P. A. B. X on disconnecting opens the loop to relay 10 and it releases to open the circuits to relays 20, 40, 50 and 210. Relay 70 operates as previously described to hold relay 50 operated until relay 90 operates on restoration of relay 20. Relay 70 restores on restoration of relay 20. Relay 90 now holds relay 50 operated as before described and relay 50 holds relay 30 operated.

Relay 210 on releasing causes the release of relay 310 and it in turn causes the operation of relay 350 and the energization of the upper winding of relay 360. The central office loop circuit is transferred from relay 370 to relay 330 to cause the release of the automatic switching equipment or signal the central office operator respectively to disconnect all as previously described. Relay 270 in the P. A. B. X termination circuit 200 is restored as already described. Relay 270 releases relay 230 to in turn release relay 90. Relay 90 on release now disconnects ground from the upper winding of relay 30 by deenergizing relay 50 and it releases to remove ground from the C lead at contacts 32 and from the busy lamp contacts 34. Up to this point the release operation is the same as described on a call by a P. A. B. X subscriber. The busy lamp is maintained lighted at contacts 85 and the C lead grounded at contacts 83 until relay 80 releases. Relay 30 on releasing opens the holding circuit to the lower winding of relay 80 at contacts 32 and 33, and relay 80 restores to darken the busy lamp and remove ground from the C lead at contacts 85 and 83 respectively so that the trunk circuit 100 is now available for use.

*Incoming calls*

On a call proceeding from a subscriber in the central office to a subscriber at the P. A. B. X the calling subscriber dials the P. A. B. X number over the automatic switch equipment having access to circuit 300. The last switch in the switch train in the central office tests for battery in any well-known manner and on finding the same extends ground and battery to the +L and −L conductors respectively to operate relay 330 over the previously described prepared loop excepting the associated line circuit line relay. If an operator is extending the call to the P. A. B. X she plugs in her cord circuit to extend ground and battery over the +L and −L conductors respectively to operate relay 330. Relay 330 closes contacts 331 to operate slow-to-release relay 340. It in turn opens contacts 348 to disconnect the carrier idle load circuit and closes contacts 343 to place battery on the SO' lead over contacts 361' to cause the carrier equipment to forward ground over the SI lead to energize the upper winding of relay 270. Relay 270 operates relay 230 which in turn forwards ground through the upper winding of relay 210 from contacts 231, the upper primary of coil 299, contacts 251 to the +T' conductor. At contacts 235 it initiates operation of the ringing machine and at contacts 232 it disconnects the idle load circuit. Ground on the +T' conductor is forwarded through relay 90, over contacts 25, 65 and the −T' conductor, contacts 254 and the lower primary of coil 299 to battery through the lower winding of relay 210. Relay 210 is not energized in series with relay 90 as previously described.

Relay 90 operates and closes contacts 91 to energize relay 50 which in turn prepares its own holding circuit at contacts 53 and extends ground on the +T' conductor through contacts 52 to contacts 11. It also closes contacts 54 to energize the upper winding of relay 30 which disconnects battery from the C conductor at contacts 35. At contacts 34 it completes a circuit for lighting the busy lamp such as 4 at each attendant's position so that they do not attempt to seize the circuit 100. At contacts 32 it grounds lead C to busy the circuit 100 to calls over switch train 3; forwards ground over contacts 84 and 61, through the upper winding of relay 80 to the +T conductor and also ground from contacts 32 is forwarded over contacts 33 to the X springs of relay 80.

The connector switch also places interrupted ringing current on the +L and −L conductors. The operator does the same by manipulating a ringing key at her position. The ringing current is forwarded from the −L conductor, A. C. relay 380, condenser 349, contacts 351 and back over the +L conductor.

The circuit to relay 340 is opened at contacts 331, but as it is slow-to-release, a holding circuit is completed therefor from contacts 342 and 383 closed by operated relay 380. Relay 380 also closes contacts 381 to shunt contacts 361' and closes contacts 382 to operate slow-to-release relay 360'. Relay 360' operates to open contacts 361', however battery forwarded over contacts 343 381 remains on the SO' lead until relay 380 releases when the A. C. ringing current is interrupted. The operating circuit for relay 360' and the holding circuit for relay 340 are temporarily opened at contacts 382 and 383 respectively, however, both hold their contacts operated until relay 380 is reoperated, while relay 330 reoperates to energize relay 340 in the interim. Release of relay 380 causes ground to be removed from the SI lead and the upper winding of relay 270 is deenergized. Although contacts 271 open relay 230 remains operated as it is slow-to-release and contacts 275 close to energize relay 240 from ground at contacts 234. Slow-to-release relay 240 closes contacts 243 to prepare its own holding circuit. It also closes contacts 241 and 242 to prepare a circuit for the lower winding of relay 210 and the upper winding of relay 250 respectively.

When the A. C. ringing current is again supplied over contacts 351 and condenser 349 to the A. C. relay 380, it operates once more to close contacts 381 and forward battery over the SO' lead to in turn operate relay 270. The holding circuit for relay 340 is again completed and also the operating circuit for relay 360' so that each receives another spurt of energizing current.

Now when relay 270 reoperates it opens the operating circuit for relay 240 at contacts 275 and completes the previously prepared holding circuit therefor from contacts 234, 276, 263 and 243. Relay 230 is of course reenergized at contacts 271. Contacts 274 on closing complete a circuit for the upper winding of relay 250 from ground at contacts 234 forwarded over contacts 274, 242 and 261. Relay 250 operates to open the first circuit through relays 210 and 90 at contacts 251 and 253. At contacts 253 resistance battery is supplied to the —T' conductor while generator ground is supplied at contacts 252 to the +T' conductor by the ringing machine. Contacts 255 include weighted mechanical springs which are arranged to oscillate the contacts in any well-known manner between an open and closed position until contacts 252 and 253 have closed for a predetermined period of time and then maintain contacts 255 in a closed position. Contacts 273 closed by relay 270 provide a short circuit for the upper winding of relay 260 making it slow-to-operate. A circuit is completed from ground at contacts 234, 274 and 242 over contacts 255 to battery through the lower winding of relay 260 to operate relay 260. Because of the short circuit on the upper winding of relay 260 it is slow-to-operate, and it does not operate until springs 255 come to rest in their closed position. This provides an operating period of desirable duration for relay 250 so that the signalling current may be supplied for such a desired period of time. Relay 260 opens contacts 261 and closes contacts 262 so that contacts 262 are now in shunt with 255. The shunt is provided around contacts 255 to prevent their burning. The circuit to relay 250 is now open and it restores. At contacts 263 the holding circuit for relay 240 is opened, and its starts to restore. This type of ringing arrangement is unnecessary during daytime periods, as a lamp individual to the trunk is lighted immediately as will be explained, to signal an operator. For night service, however, it is desirable to have the ringing signal applied for a considerable period and therefore this type of arrangement is provided.

The ringing current with ground superimposed thereon, which is applied, while relay 250 is operated, is sent over contacts 252, the +T' conductor through the condenser 98, A. C. relay 95, thermistor 77, contacts 71, and back over the —T' lead to battery through the lower winding of relay 250. Thermistor 77 is provided for preventing undue surges of current which may occur at various times from affecting relay 95. Relay 95 operates and closes contacts 96 and 97. Closing contacts 97 provides an obvious holding circuit for already operated slow-to-release relay 50 whose operating circuit is opened when relay 90 releases. Relay 60 is operated from battery through its winding and contacts 96 to ground at contacts 73. At contacts 67 it completes a circuit from ground at contacts 13 and 22 to light the P. A. B. X attendant lamps such as 3 so that an attendant answers the call. At contacts 61 it opens the prepared circuit to the upper winding of relay 80 and transfers the upper winding to generator ground forwarded over the +T' conductor and contacts 52. At contacts 68' relay 60 prepares a loop circuit for relay 10. At contacts 63 it disconnects conductors R from the lower left winding coil 99 and connects it directly to the —T' conductor at contacts 64. At contacts 65 it disconnects relay 90 from the —T' conductor and connects it to resistance battery at contacts 66 to complete another operating circuit for relay 90 from ground on the +T' conductor. At contacts 68 it completes its own holding circuit from contacts 82 and 31, while at contacts 69 it opens a point in the circuit to relay 70. When the night position is used, a cord circuit extends conductors T and R from jack J4 to a ringer at the night position. Ringing current is forwarded over contacts 52, 62, the upper winding of relay 80, conductor T, a loop to the night ringer, conductor R, contacts 64, and the —T' conductor. The ringer operates to provide an audible signal of desirable length as provided by the duration of time that relay 250 is operated.

As previously stated relay 250 restores, after relay 260 operates, to open contacts 252 and 253 and close contacts 251 and 254. Relay 260 also opens the holding circuit for relay 240 at contacts 263. As relay 240 is slow-to-release it will hold its contacts operated until relay 270 is again released. When relay 270 restores after the interruption in another application of ringing current at circuit 300, it opens contacts 274 to restore relay 260. By this time springs 255 are open. Relay 260 releases to prepare relay 250 for operation. Contacts 263, which open when relay 260 operates, reclose to prepare the holding circuit to relay 240, which is now open at contacts 276. Relay 240 receives another energizing spurt over its original operating circuit on release of relay 270. The operating cycle for relays 240, 250 and 260 is repeated as often as relay 270 is operated and restored. If only one application of interrupted ringing current is provided relay 240 restores a period of time after relay 260 opened its holding circuit at contacts 263. The circuit for relay 260 is opened at contacts 242 and it restores. As relay 270 remains operated no further circuits to relay 240 are completed and it remains unoperated. Of course each time the ringing current is disconnected from the +T' and —T' conductors, relay 95 is restored. Relay 60 of course is held operated, while relay 95 is restored, over its previously described holding circuit.

The P. A. B. X attendant on answering completes the circuit from ground on the +T' conductor, contacts 52 and 62, the upper winding of relay 80 over the tip conductor T and back over ring conductor R, contacts 64 to the —T' conductor. Nothing occurs if relay 250 is operated, however if relay 250 is released the +T' and —T' conductors are extended to ground and battery respectively through relay 210. Relay 210 is operated in this circuit while relay 90 may remain operated over its previously described operating circuit. Relay 80 operates over the above circuit in series with relay 210 to close its X contacts and is now fully energized from ground over contacts 33 and 32, while providing an additional ground for lead C at contacts 83. At contacts 82 it opens the holding circuit for relay 60, and at contacts 86 it closes the previously prepared resistance loop for relay 10 through resistance 2 and contacts 68', before relay 60 releases. Relay 10 operates to complete an already described loop through relays 40 and 210 at contacts 11 and operates relay 20 at contacts 12. It also darkens the answer lamp by opening contacts 13. Relay 40 operates to complete this previously described holding circuit for relay 50. Relay 60 releases contacts 68' to open the circuit for relay 10, but the already described loop is completed for relay 10 as contacts 21, 81 are closed when contacts 63 close. At contacts 85 an additional ground for the busy lamp 4 is provided. Relay 80 is held operated over the holding circuit to its lower winding when contacts 62 open while relay 20 opens contacts 25 to restore relay 90 if it is still operated.

Relay 210 on operating closes contacts 212 to cause relay 310 in the central office termination circuit 300 to operate as previously described. Relay 220 is operated as previously described to provide an additional holding ground for the upper winding of relay 210 at contacts 221. Relay 320 does not operate when relay 310 is now operated as contacts 341 are open. Contacts 313 close to shunt the lower winding of relay 330 through contacts 344 and 345. This allows a low resistance relay associated with the loop and in the connector to operate and cut-off the ringing current or if the central office operator is signalling to cause a cord circuit lamp to signal the operator that the P. A. B. X attendant has answered. Likewise in the connector reverse battery answer supervision may now be given.

An already described talking circuit is completed between the P. A. B. X attendant and the calling subscriber in the exchange or the operator in the exchange. The attendant now extends the call through her cord circuit to the desired P. A. B. X subscriber and completes a talking circuit between the calling and called subscriber.

If for any reason the operator at the central office desires to re-ring the attendant she merely manipulates her ringing key to operate and release relay 380. Relay 360' operates. When relay 380 restores to open contacts 381 relay 270 is restored in a manner already described to initiate the aforedescribed cycle of operations for relays 240, 250 and 260. Relay 210 however is held operated by a holding circuit completed over contacts 241, 272 and 222 so that relay 310 in circuit 300 is maintained operated. Signalling current is applied over the +T' and —T' conductors to operate relay 95 as already described. It in turn reoperates relay 60 as previously described. Relay 60 opens the circuit to relay 10 at contacts 63 and connects the R conductor to the —T conductor at contacts 64. Relay 10 releases to open the loop to relays 40 and 210. Relay 210 remains operated over the holding circuit to its lower winding. Relay 40 opens the holding circuit for relay 50 but it is slow-to-release. Relay 20 is slow-to-release and remains operated while contacts 12 open and contacts 13 close to light the P. A. B. X attendant's lamp over contacts 13, 22 and 67. Relay 60 remains operated only during the period ringing current maintains relay 95 operated. It then releases to reoperate relay 10 and restore the circuits for relays 20, 40, 50 and 210. The lamp of course is extinguished when contacts 13 open. The cycle may be repeated as often as desired by the operator at the central office until the attendant answers. At that time the attendant may establish any other desired connection.

Release of the connection by the calling central office subscriber merely causes the automatic switching equipment to restore and places circuit 300 in the same condition as after seizure on an outgoing P. A. B. X call. Likewise the operator at the central office on disconnecting places circuit 300 in the same condition as after seizure on an outgoing P. A. B. X call. Release of the connection by the P. A. B. X attendant causes the restoration of all the operated relays in circuit 100, 200 and 300 all as previously described and places these circuits in condition to be seized for another call.

Thus having described my invention and its manner of operation, but believing it capable of more widespread utilization and novelty than the particular embodiment described herein I wish to claim the subject matter incorporated in the accompanying claims.

What is claimed is:

1. In a communication system of the class including a private exchange and a central office to which said private exchange is connected by means of a carrier circuit over which a call may be completed from said central office to said private exchange and from said private exchange to said central office and wherein said central office and said private exchange each have a loop circuit for transmitting signals to and from said carrier circuit, each loop circuit normally only partially completed to battery through a relay and wherein means at said central office are provided to enable a subscriber in said central office to complete the central office loop circuit and energize the associated relay on a call to said private exchange, the improvement comprising means at said central office operated in response to the energization of said relay thereat for controlling said carrier circuit to transmit a signal to said private exchange, and means at said private exchange operated in response to the transmission of said signal to said private exchange for preventing completion of the loop circuit and energization of the relay at said private exchange to thereby prevent a call from said private exchange to said central office.

2. A system such as claimed in claim 1 in which said means for completing said central office loop circuit includes an arrangement for applying ringing current to said loop circuit, means associated with said central office loop circuit operated on the application of ringing current thereto, said last operated means controlling said carrier circuit accordingly to transmit appropriate signals to said private exchange, and means in said private exchange operated in response to the transmission of said appropriate signals for providing ringing current at said private exchange to signal said private exchange accordingly and enable the completion of the loop circuit and energization of the relay thereat.

3. In a system such as claimed in claim 2, means at said private exchange operated on answer by the attendant thereat for completing the loop circuit at said private exchange and energizing the relay thereat, said energized relay controlling said carrier circuit to transmit a corresponding signal, and means at said central office operated thereby for signalling said central office subscriber that the attendant at said private exchange has answered.

4. In a communication system of the type having a private exchange and a central office and including carrier equipment therebetween for effectuating a communication circuit from said private exchange to said central office and from said central office to said private exchange, a first circuit in said private exchange and another circuit in said central office said first circuit signalling said private exchange on a call thereto from said central office and said other circuit signalling said central office on a call thereto from said private exchange, each signalling circuit normally connected to battery through a signal relay which is energized by connecting said circuit to ground to thereby provide a signal, the improvement comprising a relay associated with each signalling circuit and operated in response to a signal transmitted over said carrier equipment, means operated on an outgoing call from said private exchange to said central office for causing said carrier equipment to transmit a signal for operating the relay in the central office, said operated relay connecting its associated signalling circuit to ground to thereby operate the signal relay in said circuit for signalling said central office, and means operated on an outgoing call from said central office to said private exchange for causing said carrier equipment to transmit a signal for operating the relay in the private office for connecting ground to its associated signalling circuit to thereby operate the signal relay in said circuit to signal the private exchange.

5. For use in establishing a communication circuit between one exchange including an attendant's position and switching equipment whereby a subscriber at a station therein may extend a connection to a first two conductor line arranged in an incomplete circuit with battery connected through a relay to one of the conductors and from said two conductor line to carrier equipment provided for extending a communication circuit from said first two conductor line to a second exchange wherein a second two conductor line is provided, said second two conductor line arranged in an incomplete circuit with one conductor connected to battery through a relay and wherein said second exchange includes switching equipment whereby a connection and a communication circuit may be extended from said second two conductor line to a station in said second exchange, the improvement comprising means responsive to a station in said one exchange being connected by the associated switching equipment to said first two conductor line for completing a circuit including both conductors thereof and the associated relay for operating said relay, means operated by said operated relay for controlling said carrier equipment, means in said second exchange operated by said controlled carrier equipment for completing a circuit including both conductors of the second line and the associated relay for operating said associated relay to thereby cause the switching equipment in said second exchange to be associated with said second two conductor line and whereby said second line is arranged to form a loop circuit for controlling said second exchange switching equipment, said means for operating said relay in said second exchange thereafter responsive to signalling pulses transmitted over said first switching equipment from said one station and repeated by said relay in said first exchange for controlling said carrier equipment accordingly to thereby control the loop circuit in said second exchange to operate the switching equipment in said second exchange to establish a connection to a called subscriber whereby a communication circuit including said first and second two conductor lines and said carrier equipment is established on answer by a subscriber at a called station.

6. For use in establishing a communication circuit between one exchange including an attendant's position and switching equipment whereby a subscriber at a station therein may extend a connection to a first two conductor line arranged in an incomplete circuit with battery connected through a relay to one of the conductors and from said two conductor line to carrier equipment provided for extending a communication circuit from said first two conductor line to a second exchange wherein a second two conductor line is provided, said second two conductor line arranged in an incomplete circuit with one conductor connected to battery through a relay and wherein said second exchange includes switching equipment whereby a connection and a communication circuit may be extended from said second two conductor line to a subscriber in said second exchange, said second exchange switching equipment available to a subscriber at a station in said second exchange for establishing a connection and a communication circuit from said last subscriber to said second two conductor line, said last switching equipment including means for applying signalling current to said two conductor line when a connection thereto is established from a subscriber in said second exchange, the improvement comprising means responsive to a station in said one exchange being connected by the associated switching equipment to said first two conductor line for completing a circuit therewith to operate said relay connected to said one conductor, means operated by said operated relay for controlling said carrier equipment, means in said second exchange operated by said controlled carrier equipment for completing a circuit with the second two conductor line to operate its associated relay to thereby cause the switching equipment in said second exchange to be associated with said second two conductor line and whereby said second line is arranged to form a loop circuit for controlling said second exchange switching equipment, said means for operating said relay in said second exchange thereafter responsive to signalling pulses transmitted over said first switching equipment and repeated by said relay in said first exchange for controlling said carrier equipment and the second exchange switching equipment over said second two conductor line to establish a connection and a communication circuit to a called subscriber, said second exchange switching equipment effective on a call from a subscriber in said second exchange to said one exchange to complete a circuit with said two conductors of said second line, means thereafter controlled by said second two conductor line for controlling said carrier equipment, means in said one exchange controlled by said controlled carrier equipment for completing a circuit with said two conductor line in said one exchange, means operated when said last circuit is completed for preventing the relay in said one exchange from operating, means in said second exchange controlled by the application of signalling current to said two conductor line in said second exchange for controlling said carrier equipment to thereby control said controlled means in said one exchange, and means operated when said last controlled means is controlled in response to the application of said signalling current for signalling said attendant's position.

7. For use in establishing a communication circuit between one exchange including an attendant's position and switching equipment whereby a subscriber at a station therein may extend a connection to a first two conductor line arranged in an incomplete circuit with battery connected through a relay to one of the conductors and from said two conductor line to carrier equipment provided for extending a communication circuit from said first two conductor line to a second exchange wherein a second two conductor line is provided, said second two conductor line arranged in an incomplete circuit with one conductor connected to battery through a relay, and wherein said second exchange includes switching equipment whereby a connection and a communication circuit may be extended from said second two conductor line to a subscriber at a station in said second exchange, said second exchange switching equipment available to a subscriber in said second exchange for establishing a connection and a communication circuit from the associated station to said second two conductor line, said last switching equipment including means for applying signalling current to said two conductor line when a connection thereto is established from a station in said second exchange, the improvement comprising means responsive to a station in said one exchange being connected by the associated switching equipment to said first two conductor line for completing a circuit therewith to operate said relay connected to said one conductor, means operated by said operated relay for controlling said carrier equipment, means in said second exchange operated by said controlled carrier equipment for completing a circuit including said two conductor second line to operate said associated relay to thereby cause the switching equipment in said second exchange to be associated with said second two conductor line and whereby said second two conductor line is arranged to form a loop circuit for controlling said second exchange switching equipment, said means for operating said relay in said second exchange thereafter responsive to signalling pulses transmitted over said first switching equipment by said first subscriber and repeated by said relay in said first exchange to control said carrier equipment for operating the second exchange switching equipment over said loop circuit to establish a connection to a called station, said second exchange switching equipment effective on a call from a subscriber in said second exchange to said first exchange to form a circuit of said two conductor second line, means thereafter controlled by said second two conductor line for controlling said carrier equipment, means in said one exchange controlled by said controlled carrier equipment for completing a circuit with said two conductor line in said one exchange, means thereafter operated for preventing the relay in said one exchange from operating, means in said second exchange controlled by the application of signalling current to said two conductor line in said second exchange for controlling said carrier equipment to thereby control said controlled means in said one exchange accordingly, means operated when said last controlled means is controlled in response to the application of said signalling current for signalling said attendant's position, and means operated on answer by the attendant at said position for operating said relay at said one exchange over said first two conductor line at said exchange to establish a communication circuit between said calling subscriber and the attendant including said first and second two conductor lines and said carrier equipment.

8. In a communication system of the class having a private exchange with private lines, switching equipment and an attendant's position, said private exchange connected to a central office over a connection including carrier equipment, said private exchange having a terminating connection in said central office comprising two conductors, one of said conductors having battery connected thereto through two control relays, said central office including switching equipment available to said private exchange for completing a connection to a station in said central office and available to a subscriber at a station in said central office for enabling the completion of a connection to said two conductors and adapted to provide signalling current over said conductors on completion of a connection thereto, the improvement comprising a first circuit in said private exchange completed by a subscriber at one of said private lines on initiating a call to a subscriber in said central office and dialling a predetermined digit on the private exchange switching equipment, said first circuit thereafter arranged to control said carrier equipment and to transmit dial impulses received from said private line over said carrier equipment to said central office, a control circuit including a third relay at said central office, means at said central office operated in response to the control of said carrier equipment for disconnecting one of said control relays from said one conductor and for completing said control circuit over said one conductor and the other control relay to thereby operate said other control relay and the third relay of said control circuit, said other control relay operated for associating the central office switching equipment with both said conductors, means operated by said third relay for enabling the control of said central office switching equipment over said two conductors, said means operated in response to the control of said carrier equipment also operated in accordance with dial impulses received by said first circuit in said private exchange and transmitted over said carrier equipment to control said means accordingly, means operated by said controlled means in said central office in accordance with said dialled digits for operating said central office switching equipment over said two conductors to establish a connection to a station in said central office, said central office switching equipment operated on a call initiated by a subscriber in said central office to said private exchange for establishing a loop circuit including said two conductors and said two control relays whereby only the one control relay is operated, means operated by said operated one control relay for controlling said carrier equipment, means in said private exchange operated in response to said last control for preventing the completion of said first circuit in said private exchange, means at said central office operated in response to the provision of signalling current over said two conductors for controlling said carrier equipment accordingly, signalling means in said private exchange, said signalling means in said private exchange operated in response to the control of said carrier equipment by said signalling current operated means for signalling said attendant's position, and means operated on answer by the attendant at said position for completing said first circuit to thereby establish a talking circuit to the calling subscriber including said first circuit, carrier equipment and two conductors.

9. In a communication system of the class having a private exchange with private lines, switching equipment and an attendant's position, said private exchange connected to a central office over a connection including carrier equipment, said private exchange having a terminating connection in said central office comprising two conductors, one of said conductors having battery connected thereto through two control relays, said central office including switching equipment available to said private exchange for completing a call to a subscriber in said central office and available to a subscriber at a station in said central office for enabling the completion of a connection from the station to said two conductors and adapted to provide signalling current over said conductors on completion of a connection thereto, the improvement comprising a first circuit in said private exchange completed by a subscriber at one of said private lines on initiating a call to a subscriber in said central office and dialling a predetermined digit on the private exchange switching equipment, said first circuit thereafter arranged to control said carrier equipment and to transmit dial impulses received from said private line over said carrier equipment to said central office, a control circuit including a third relay at said central office, means at said central office operated in response to the control of said carrier equipment for disconnecting one of said two control relays from said one conductor and for completing said control circuit through said third relay and over said one conductor and the other control relay to thereby operate said other control relay and the third relay, said other control relay operated for associating the central office switching equipment with both said conductors, means operated by said included relay for enabling the control of said central office switching equipment over said two conductors, said means operated in response to the control of said carrier equipment also operated in accordance with dial impulses received by said first circuit in said private exchange and transmitted over said carrier equipment, means operated by said control means in said central office in accordance with said dialled digits for operating said central office switching equipment over said two conductors to establish a connection to a subscriber in said central office, said central office switching equipment operated on a call initiated by a subscriber in said central office to said private exchange for establishing a loop circuit including said two conductors and said two control relays whereby only said one control relay is operated, means operated by said operated one control relay for enabling the control of said carrier in response to the provision of signalling current thereto, means at said central office operated in response to the provision of signalling current over said two conductors for controlling said carrier equipment accordingly, and signalling means in said private exchange, said signalling means in said private exchange operated in response to the control of said carrier equipment by said signalling current operated means for signalling said attendant's position.

10. In a communication system of the class having a private exchange with private lines and switching equipment, said private exchange connected to a central office over a connection including carrier equipment, said private exchange having a terminating connection in said central office comprising two conductors, one of said conductors having battery connected thereon through a relay, said central office including switching equipment available to said private exchange for completing a connection to a subscriber in said central office, the improvement comprising a first circuit in said private exchange completed by a subscriber at one of said private lines on initiating a call to a subscriber in said central office and dialling a predetermined digit on the private exchange switching equipment, said first circuit thereafter aranged to control said carrier equipment to transmit dial impulses received from said private line over said carrier equipment to said central office, a control circuit including a relay at said central office, means at said central office operated in response to the control of said carrier equipment for completing said control circuit over said one conductor and its connected relay to battery to thereby operate both relays, said connected relay operated for connecting the central office switching equipment with both said conductors, means operated by said included relay for enabling the control of said central office switching equipment over said two conductors, said means operated in response to and in accordance with dial impulses transmitted by said carrier equipment when controlled by said first circuit in said private exchange, and means operated by said controlled means in said central office in accordance with said dialled digits for operating said central office switching equipment over said two conductors to establish a connection to a subscriber in said central office.

11. In a communication system including a private exchange and a central office to which said private exchange is connected by means of a carrier circuit and wherein a loop circuit corresponding to said private exchange is partially completed to battery through a first relay, connecting means at said central office for completing a connection from said loop circuit to a station in said central office, said connecting means also effective on a call initiated by a subscriber at a station in said central office to complete a connection from the station to said loop circuit, the improvement comprising a second relay at said central office operated over said carrier circuit on a call from said private exchange to said central office for disconnecting said first relay from said loop circuit and for completing said loop circuit to prevent said connecting means from completing a connection thereto on a call from a subscriber in said central office and for establishing control of said connecting means via said loop circuit, controlled means thereafter controlled over said carrier circuit for causing said connecting means to be operated via said loop circuit for establishing a connection to a subscriber in said central office, and means including a portion of said first loop circuit effective in case of a connection established to said loop circuit by said connecting means on a call from a subscriber in said central office for operating said disconnected second relay to cause said carrier circuit to signal said private exchange.

12. For use in establishing a communication circuit between one exchange including an attendant's position and switching equipment whereby a subscriber at a station therein may extend a connection to a two conductor line arranged with battery connected through a relay to one of the conductors and with the other conductor normally unconnected to a source of potential and from said two conductor line to carrier equipment provided for extending a communication circuit from said first two conductor line to a second exchange wherein a second two conductor line is provided, said second two conductor line arranged so that one conductor is connected to battery through a relay and the other conductor is normally unconnected to a source of potential and wherein said second exchange includes switching equipment whereby a connection and a communication circuit may be extended from said second two conductor line to a station in said second exchange, said second exchange switching equipment available to a subscriber at a station in said second exchange for establishing a connection and a communication circuit from said last station to said second two conductor line, said last switching equipment including means for applying signalling current to said two conductor line when a connection thereto is established from a station in said second exchange, the improvement comprising means responsive to a station in said one exchange being connected to said first two conductor line for closing the unconnected conductor thereof to a source of potential for operating said relay connected to said one conductor, means operated by said operated relay for controlling said carrier equipment, means in said second exchange operated by said controlled carrier equipment for connecting a source of potential to the conductor of the second line connected to battery through its associated relay to thereby cause the switching equipment in said second exchange to be associated with said second two conductor line and whereby said source of potential is connected to the other conductor of said second line to form a loop circuit for controlling said second exchange switching equipment, said means for operating said relay in said second exchange thereafter responsive to signalling pulses transmitted over said first switching equipment from said station in said first exchange and by said relay in said first exchange over said carrier equipment for controlling the second exchange switching equipment over said second two conductor line to establish a connection to a called station therein whereby a communication circuit is established between said called station and said calling station, said second exchange switching equipment effective on a call from a subscriber at a station in said second exchange to said one exchange to connect said unconnected conductor of said second line to a source of potential, means thereafter controlled by said second two conductor line for controlling said carrier equipment, means in said one exchange controlled by said controlled carrier equipment for connecting the unconnected conductor in said one exchange to a source of potential, means operated when said unconnected conductor is connected to said source of potential for preventing the relay in said one exchange from operating, and means in said second exchange controlled by the application of signalling current to said two conductor line in said second exchange for controlling said carrier equipment to thereby control said controlled means in said one exchange accordingly, means operated when said last controlled means is controlled in response to the application of said signalling current for signalling said attendant's position, and means operated on answer by the attendant at said position for operating said relay at said one exchange over said two conductor line at said exchange, said means operated by said relay operated for controlling said carrier equipment to control the means in said second exchange controlled by said controlled carrier equipment for preventing the application of signalling current to the two conductor line in said second exchange.

13. In a communication system of the class having a private exchange with private lines, switching equipment and an attendant's position, said private exchange connected to a central office over a connection including carrier equipment, said private exchange having a terminating connection in said central office comprising two conductors, one of said conductors having battery connected thereon through two relays, said central office including switching equipment available to said private exchange for completing a connection to a subscriber in said central office and available to a subscriber in said central office for enabling the completion of a connection to said two conductors and adapted to provide signalling current over said conductors on completion of a connection thereto, the improvement comprising a first circuit in said private exchange completed by a subscriber at one of said private lines on initiating a call to a subscriber in said central office and dialling a predetermined digit on the private exchange switching equipment, means operated by said completed circuit for controlling said carrier equipment, a control circuit including a relay at said central office, means at said central office operated in response to the control of said carrier equipment for disconnecting one of said two relays from its conductor and for completing said control circuit through its included relay over said one conductor and the other relay to battery to thereby operate said other relay and the included relay, said other relay operated for connecting the central office switching equipment with both said conductors, means operated by said included relay for enabling the control of said central office switching equipment over said two conductors, said means operated in response to the control of said carrier equipment also operated in accordance with digits dialled over said first circuit in said private exchange for controlling said carrier equipment, means operated by said controlled means in said central office in accordance with said dialled digits for operating said central office switching equipment over said two conductors to establish a connection to a subscriber in said central office, said central office switching equipment operated on a call initiated by a subscriber in said central office to said private exchange for establishing a loop circuit including said two conductors and said two relays connected to said one conductor whereby only said formely disconnected relay is operated, means operated by said operated formerly disconnected relay for controlling said carrier equipment, means at said private exchange operated in response to the last control of said carrier equipment for preventing the completion of said first circuit in said private exchange, means at said central office operated in response to the provision of signalling current over said two conductors for controlling said carrier equipment, signalling means in said private exchange, said signalling means in said private exchange operated in response to the control of said carrier equipment by said signalling current operated means for signalling said attendant's position, and means operated on answer by the attendant at said position for completing said first circuit in said private exchange, said completed first circuit controlling said carrier equipment for operating said first means operated thereby in said central office for preventing the provision of further signalling current to said two conductors by said central office switching equipment.

References Cited in the file of this patent

UNITED STATES PATENTS 2,005,836 Almquist et al. ---------- June 25, 1935